3,383,384
PROCESS AND INTERMEDIATES FOR MANUFACTURE OF 19-NORSTEROIDS
Raphael Pappo, Skokie, Ill., assignor to G. D. Searle & Co., Chicago, Ill., a corporation of Delaware
No Drawing. Continuation-in-part of applications Ser. No. 401,223, Oct. 2, 1964; Ser. No. 494,930, Oct. 11, 1965; and Ser. No. 502,373 and Ser. No. 502,374, Oct. 22, 1965. This application Nov. 15, 1965, Ser. No. 507,714
5 Claims. (Cl. 260—239.5)

ABSTRACT OF THE DISCLOSURE

A novel process and novel intermediates useful in the manufacture of pharmacologically valuable 19-norsteroidal derivatives. Those intermediates are manufactured by an alkali metal-ammonia reduction of the 3-aminoestra-1,3,5(10)-triene starting materials. Hydrolysis of the resulting enamines results in the corresponding $\Delta^4$ or $\Delta^{5(10)}$-3-keto compounds which are pharmacologically useful themselves or can be converted by known methods to known pharmacologically useful 19-nor compounds.

This application is a continuation-in-part of my copending applications Ser. No. 401,223, filed Oct. 2, 1964, now abandoned, Ser. No. 494,930, filed Oct. 11, 1965, now U.S. Patent 3,318,907, Ser. No. 502,373, filed Oct. 22, 1965, now U.S. Patent 3,337,542, and Ser. No. 502,374, filed Oct. 22, 1965, now U.S. Patent 3,325,481.

The present invention relates to a novel process for the manufacture of 19-norsteroids and to novel intermediates utilized in that process.

A starting material suitable for utilization in the instant process is 6-amino-1-tetralone, which is described by Allinger and Jones, J. Org. Chem., 27, 70 (1962). In the initial step of the instant process, that starting material is contacted with a vinyl organometallic reagent, preferably in a suitable organic solvent medium such as diethyl ether, dibutyl ether, tetrahydrofuran, etc., to afford 6-amino-1-vinyl-1-tetralol. Alternatively, 6-amino-1-tetralone or 6-amino-1-vinyl-1-tetralol is converted to an intermediate wherein the amino group has been alkylated or acylated. The particular intermediates envisaged are illustrated by the 1-vinyl-1-tetralols of the following structural formula

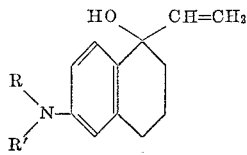

wherein R and R' are selected from the group consisting of hydrogen, hydrocarbon, (hydroxy-substituted)hydrocarbon, (amino-substituted)hydrocarbon, acyl and hydrocarbon-sulfonyl radicals and R and R' together can comprise the residue of a cycloaliphatic amine.

The hydrocarbon radicals indicated in the foregoing structural representation may be lower alkyl radicals such as methyl, ethyl, propyl, butyl, pentyl, hexyl, heptyl and the branched-chain groups isomeric therewith, aryl radicals such as phenyl, tolyl, and xylyl, or aralkyl radicals such as benzyl and phenethyl. Rrepresentative of the acyl radicals depicted therein are lower alkanoyl groups such as acetyl, propionyl, butyryl, valeryl, caproyl, heptanoyl and the branched-chain radicals isomeric therewith and aroyl groups such as benzoyl, toluoyl, and xyloyl. The hydrocarbon-sulfonyl radicals are exemplified by p-toluenesulfonyl, benzenesulfonyl and methanesulfonyl. Examples of the cycloaliphatic amines whose residues R and R' can represent are pyrrolidine, piperidine, morpholine, pipecoline, piperazine, N-alkylpiperazines and hexamethylenimine. Their preparation is described in my copending application Ser. No. 494,930, filed Oct. 11, 1965, now U.S. Patent 3,318,907.

When the above described 1-vinyl-1-tetralols are alkylated with a 2-alkylcyclopentane-1,3-dione in the presence of a suitable alkaline catalyst such as potassium hydroxide, sodium hydroxide or triethylamine there is produced, depending upon the length of reaction, a tricyclic dione of the structural formula

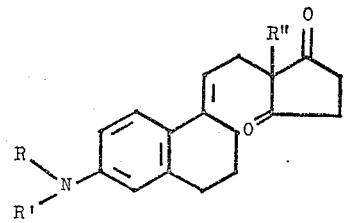

or a tetracyclic 14-hydroxy-17-one of the structural formula

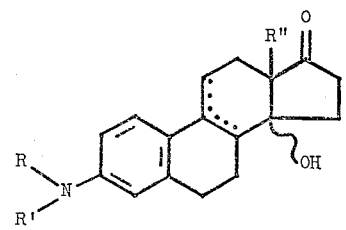

wherein R and R' are as hereinbefore defined, R" is a lower alkyl radical as hereinbefore exemplified, the dotted lines are indicative of a double bond linking carbon 9 to an adjacent C-ring carbon atom and the wavy line denotes the alternative α or β configuration at carbon 14. The preparation of the latter substances is disclosed in my copending application Ser. No. 502,373 filed Oct. 22, 1965, now U.S. Patent 3,337,542.

When the aforementioned tricyclic or 14-hydroxy tetracyclic intermediates are dehydrated, the corresponding tetracyclic pentaenes of the following structural formula.

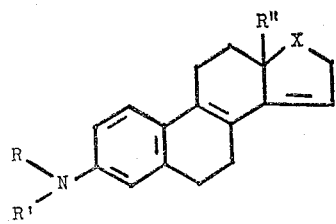

are produced. In that structural representation, the terms R, R' and R" are as hereinbefore defined, and X can be a carbonyl, hydroxymethylene or ketalized carbonyl group. In the instances where X represents a carbonyl group, these intermediates may be reduced by the method described hereinbefore to afford the corresponding 17-hydroxy compounds or may be contacted with a mono- or dihydric alcohol by the procedure described hereinbefore to afford the corresponding 17-ketals. This dehydration process is preferably conducted in an organic solvent medium in the presence of a strong acid catalyst. Thus, 2 - methyl - 2 - (6-pyrrolidino-1-naphthyliden)ethylcyclopentane-1,3-dione is heated in benzene with p-toluene-sulfonic acid to yield 3 - pyrrolidinoestra-1,3, 5(10)-8(9),14-pentaen-17-one.

The aforementioned 1,3,5(10),8(9),14-pentaenes can be selectively hydrogenated to afford the corresponding 1,3,5(10),8(9)-tetraenes of the following structural formula

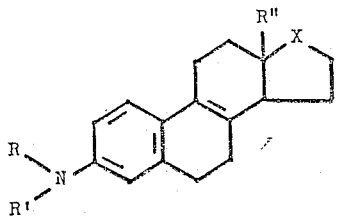

wherein R, R', R" and X are as hereinbefore defined. The aforementioned 3-pyrrolidinoestra-1,3,5(10),8(9)-14-pentaen-17-one, for example, in a solution of benzene and pyridine, is shaken in a hydrogen atmosphere in the presence of 5% palladium-on-calcium carbonate catalyst, thus producing 3 - pyrrolidinoestra - 1,3,5(10), 8(9) - tetraen-17-one. The tetraen-17-ones encompassed by the latter structural formula are similarly converted to the corresponding 17-hydroxy and 17-ketal derivatives by methods analogous to those described hereinbefore. The tetraenes of the latter structural formula are useful also as anti-fungal and anti-protozoal agents in view of their ability to inhibit the growth of such organisms as *Trichophyton mentagrophytes* and *Tetrahymena gelleii*. In addition, they are inhibitors of dicotyledonous seed germination.

Reduction of the 8(9) double bond of the latter intermediates is conveniently effected by means of an alkali metal-liquid ammonia combination, optionally in the presence of aniline. Particularly suitable alkali metals are sodium, potassium and lithium. By that process, there are produced the 1,3,5(10)-trienes of the following structural formula

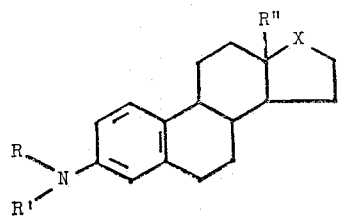

wherein R, R', R" and X are as hereinbefore defined. As a specific example, 3 - pyrrolidinoestra-1,3,5(10),8(9)-tetraen-17β-ol in tetrahydrofuran containing aniline is allowed to react with sodium and liquid ammonia to produce 3-pyrrolidinoestra-1,3,5(10)-trien-17β-ol.

Reduction of either the instant 1,3,5(10),8(9)-tetraenes or the 1,3,5(10)-trienes with an alkali metal and liquid ammonia results in the 2,5(10)-dienes of the following structural formula

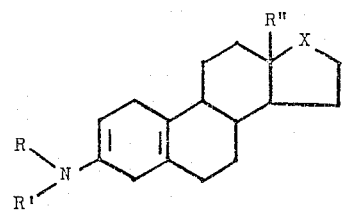

wherein R, R', R" and X are as hereinbefore defined. Thus, either 3 - dimethylaminoestra-1,3,5(10)-trien-17β-ol or 3 - dimethylaminoestra-1,3,5(10),8(9)-tetraen-17β-ol, when contacted with lithium metal and liquid ammonia in tetrahydrofuran containing tertiary-butyl alcohol, affords 3-dimethylaminoestra-2,5(10)-dien-17β-ol.

Careful acid hydrolysis of the latter 2,5(10)-diene intermediates affords the corresponding 3-keto-$\Delta^{5(10)}$ compounds of the following structural formula

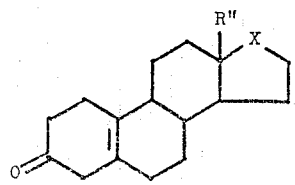

wherein R" and X are as hereinbefore defined. The latter substances are known intermediates to pharmacologically useful compounds. The hydrolysis of 3-dimethylaminoestra - 2,5(10) - dien-17-one thus results in estr-5(10)-ene-3,17-dione, which is useful in the manufacture of 17α - ethynyl-17β-hydroxyestr-5(10)-en-3-one, a known progestational agent. More vigorous acid hydrolysis of the aforementioned 2,5(10)-diene intermediates affords the known 3-keto-$\Delta^4$ compounds of the following structural formula

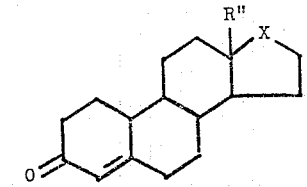

wherein R" and X are as hereinbefore defined. The latter substances are useful as intermediates in the manufacture of known pharmacologically useful steroids possessing the 3-keto-$\Delta^4$ structure. The compounds of the latter structural formula wherein X is a ketalized carbonyl function are particularly useful intermediates in view of the stability of the ketal function to alkaline reagents. Thus, 3-dimethylaminoestra-2,5(10)-dien-17-one 17-diethyl ketal is contacted with aqueous sodium acetate in methanol to yield estr-4-ene-3,17-dione 17-diethyl ketal. Reduction of the 3-keto group is effected by reaction with lithium tri-(tertiary-butoxy)aluminum hydride in tetrahydrofuran, thus affording 3β - hydroxyestr - 4-en-17-one 17-diethyl ketal, and the 17-ketal function is removed by reaction with aqueous acetic acid to yield 3β-hydroxyestr-4-en-17-one. Ethynylation of the latter substance followed by acetylation of the resulting 17α-ethynylestr-4-ene-3β,17β-diol affords the known pharmacologically useful 17α-ethynylestr-4-ene-3β,17β-diol 3,17-diacetate.

The products of the instant process described hereinbefore are obtained as dl-mixtures. The individual d and l enantiomorphs are obtained, however, by resolution techniques involving salt formation between the 3-amino moiety and an optically active acid. Suitable acids for this purpose are exemplified by d-camphorsulfonic, d,α-bromocamphorsulfonic, l-malic, l-mandelic, l-menthoxyacetic, d and l-tartaric, d and l-diacetyltartaric and d and l-dibenzoyltartaric acid. Thus, dl-3-dimethylaminoestra-1,3,5(10),8(9),14-pentaen-17β-ol is contacted with d-dibenzoyltartaric acid to afford the amine salt, which is decomposed with aqueous sodium hydroxide in methanol to yield levorotatory 3 - dimethylaminoestra-1,3,5(10)-8(9),14-pentaen-17β-ol. An alternative procedure for obtaining the instant optically active compounds involves the use of an optically active reagent to effect an assymetric synthesis. As a specific example, 2-methyl-2-(6-dimethylamino - 1 - naphthyliden)ethylcyclopentane-1,3-dione is heated in benzene with d-camphorsulfonic acid to afford levorotatory 3 - dimethylaminoestra-1,3,5(10),8(9),14-pentaen-17-one.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

To a solution containing 105 parts of liquid ammonia, 45 parts of tetrahydrofuran and 17.9 parts of aniline is added successively 5.44 parts of 3-pyrrolidinoestra-1,3,5(10),8(9)-tetraen-17β-ol and 1.5 parts of sodium metal. The resulting blue reaction mixture is stirred for about 3 hours at the reflux temperature, following which time 2.9 parts of solid ammonium chloride is added in order to destroy the excess reagent. The ammonia is removed by distillation under nitrogen, and the residual material is diluted with water, then extracted with benzene. The benzene solution is washed with water, dried over anhydrous sodium sulfate and concentrated to dryness under reduced pressure. The resulting residue is triturated with ether, then recrystallized from ethanol to afford 3-pyrrolidinoestra-1,3,5(10)-trien-17β-ol, melting at about 175–177°.

EXAMPLE 2

To a mixture of 1.2 parts of sodium metal with 85 parts of liquid ammonia is added, dropwise with stirring over a period of about 5 minutes, a solution consisting of 4.29 parts of 3-dimethylaminoestra-1,3,5(10)8(9)-tetraen-17β-ol, 14.4 parts of aniline and 34 parts of tetrahydrofuran. After approximately 40 minutes of reaction time, 2.3 parts of solid ammonium chloride is added cautiously, resulting in disappearance of the blue color. The ammonia is allowed to evaporate under a nitrogen atmosphere, and the residual mixture is steam distilled in order to remove aniline. The resulting residue is dissolved in benzene, and the organic layer thus obtained is washed with water, then dried over anhydrous sodium sulfate. Distillation of the solvent under reduced pressure affords a crystalline residue, which is purified by recrystallization from benzene to yield pure 3-dimethylaminoestra-1,3,5(10)-trien-17β-ol, melting at about 157–160.5°. A second recrystallization from ethanol affords the pure substance, melting at about 160–162°. This compound displays ultraviolet absorption maxima, in methanol, at about 252 and 302 millimicrons with molecular extinction coefficients of about 13,050 and 2,400, respectively.

EXAMPLE 3

To a mixture of 1.39 parts of sodium metal with 97 parts of liquid ammonia is added, dropwise with stirring over a period of about 5 minutes, a mixture containing 6.25 parts of 3-dimethylaminoestra-1,3,5(10),8(9)-tetraen-17-one 17-diethyl ketal, 16.9 parts of aniline and 41 parts of tetrahydrofuran. The reaction mixture is stirred for about one hour, after which time 3.86 parts of solid ammonium chloride is added cautiously. Dilution with toluene followed by evaporation of the ammonia under nitrogen results in the precipitation of inorganic salts which are removed by filtration. The clear yellow filtrate is washed successively with 5% aqueous sodium hydroxide and water until neutral, then is dried over anhydrous sodium sulfate and evaporated to dryness under reduced pressure. Crystallization of the residual oil from ethanol containing a small quantity of triethylamine affords crystals of 3-dimethylaminoestra-1,3,5(10)-trien-17-one 17-diethyl ketal, melting at about 85–86°. A second recrystallization from ethanol containing triethylamine results in the pure compound, melting at about 88–89.5°. This compound exhibits, in methanol, ultraviolet absorption maxima at about 252 and 300 millimicrons with molecular extinction coefficients of about 12,560 and 3,530, respectively.

EXAMPLE 4

To a mixture of 1.4 parts of sodium metal with 100 parts of liquid ammonia is added, dropwise with stirring over a period of about 5 minutes, a solution containing 6.24 parts of 3-dimethylaminoestra-1,3,5(10)8(9)-tetraen-17-one 17-dimethyl ketal, 18 parts of aniline and 44 parts of tetrahydrofuran. At the end of that reaction time, an additional 0.3 part of sodium metal is added, and the persistent blue color is destroyed by the addition of 3 parts of ammonium chloride. Dilution of that mixture with toluene followed by filtration in order to remove precipitated inorganic salts and evaporation of the ammonia under nitrogen affords an organic solution, which is washed successively with 5% aqueous sodium hydroxide and water. Drying over anhydrous sodium sulfate followed by distillation of the solvent under reduced pressure affords an oily residue, which is purified by crystallization from methanol containing a small quantity of triethylamine, thus producing crystals of 3-dimethylaminoestra-1,3,5(10)-trien-17-one 17-dimethyl ketal, melting at about 132–134°.

EXAMPLE 5

To a mixture of 84 parts of liquid ammonia with 19.5 parts of tertiary-butyl alcohol is added successively a solution of 5.04 parts of 3-dimethylaminoestra-1,3,5(10)-trien-17β-ol in 90 parts of tetrahydrofuran and 1.2 parts of lithium metal portionwise over a period of about 3 hours. At the end of the reaction period, 9.6 parts of ethanol is added dropwise in order to destroy excess reagent. The ammonia is evaporated under nitrogen, and the residual mixture is partitioned between benzene and water. The aqueous layer is separated, extracted several times with benzene, and the benzene extracts thus obtained are combined with the original organic layer. Washing of that solution with water followed by drying over anhydrous sodium sulfate and evaporation of the solution to dryness under reduced pressure affords 3-dimethylaminoestra-2,5(10)-dien-17β-ol as an oil, characterized by the following structural formula

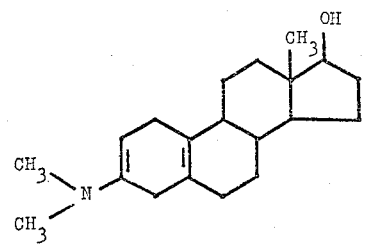

EXAMPLE 6

To a mixture of 53 parts of liquid ammonia with 12.3 parts of tertiary-butyl alcohol is added successively a solution of 2 parts of 3-dimethylaminoestra-1,3,5(10)-trien-17-one 17-diethyl ketal in 57.6 parts of tetrahydrofuran and 0.19 part of lithium metal. Stirring is continued for about 3½ hours, following which time 1.2 parts of ethanol is added in order to destroy the excess reagent. After distillation of the ammonia under nitrogen, the residual mixture is diluted with toluene and water. The organic layer is separated, washed several times with water, then dried over anhydrous sodium sulfate and freed of solvent by distillation under reduced pressure to yield as an oil, 3-dimethylaminoestra-2,5(10)-dien-17-one 17-diethyl ketal, characterized by the following structural formula

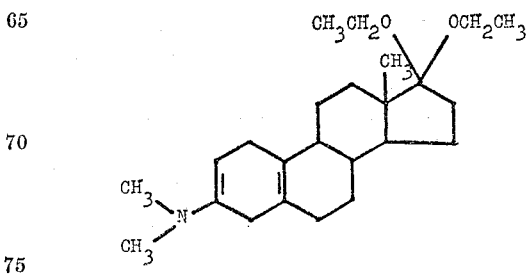

EXAMPLE 7

To a solution of 5 parts of 3-dimethylaminoestra-2,5(10)-dien-17β-ol in 352 parts of benzene, in a nitrogen atmosphere, is added 60 parts of concentrated hydrochloric acid dissolved in 200 parts of water, and the resulting mixture is stirred vigorously at room temperature for about 16 hours. The layers are then separated, and the benzene solution is washed successively with dilute hydrochloric acid, 5% aqueous sodium bicarbonate and water until neutral. Drying over anhydrous sodium sulfate followed by evaporation of the mixture to dryness under reduced pressure affords a residual foam-like material, which is triturated with ether to yield, as a crystalline solid, 17β-hydroxyestr-5(10)-en-3-one. Recrystallization from benzene affords the pure material, melting at about 156–167°.

EXAMPLE 8

To a solution of 5 parts of 3-dimethylaminoestra-2,5(10)-dien-17-one 17-diethyl ketal in 160 parts of methanol is added a solution of 5 parts of sodium acetate in 25 parts of water, in a nitrogen atmosphere. The resulting heterogeneous mixture is stirred at room temperature for about 16 hours, then is reduced to a small volume by distillation under reduced pressure. The residual mixture is extracted with benzene, and the benzene solution is separated, washed with water until neutral, then dried over anhydrous sodium sulfate and evaporated to dryness under reduced pressure. Purification of the resulting residual oil by successive recrystallization from ether containing a small quantity of triethylamine affords estr-4-ene-3,17-dione 17-diethyl ketal, melting at about 126–128°. This compound exhibits an ultraviolet absorption maximum at about 240 millimicrons with a molecular extinction coefficient of about 16,220.

EXAMPLE 9

Method A

A solution of 6.5 parts of sodium acetate in 32.5 parts of water is added to a solution of 6.5 parts of 3-dimethylaminoestra-2,5(10)-dien-17β-ol in 104 parts of methanol, and that reaction mixture is kept at room temperature for about 4½ hours. The majority of the solvent is then distilled under reduced pressure, and the residual mixture is extracted with benzene. The benzene extract is washed successively with water, 5% hydrochloric acid, 5% aqueous sodium bicarbonate and water until neutral, then is dried over anhydrous sodium sulfate and evaporated to dryness under reduced pressure to afford 17β-hydroxyestr-4-en-3-one, characterized by an ultraviolet absorption maximum at about 240 millimicrons.

Method B

To a solution of 3 parts of 17β-hydroxyestr-5(10)-en-3-one in 576 parts of isopropyl alcohol is added a solution of 28.8 parts of concentrated hydrochloric acid in 48 parts of water, and that reaction mixture is kept in a nitrogen atmosphere at room temperature for about 16 hours. The mixture is then diluted with water and extracted with benzene. The benzene layer is separated, washed with water, dried over anhydrous sodium sulfate and concentrated to dryness under nitrogen. Crystallization of the resulting oily residue from ether-hexane affords crystals of 17β-hydroxyestr-4-en-3-one, melting at about 120–124.5°.

EXAMPLE 10

A mixture containing 5.12 parts of estr-4-ene-3,17-dione 17-diethyl ketal, 40 parts of acetone and 50 parts by volume of 1 N hydrochloric acid is stored in a nitrogen atmosphere at room temperature for about 72 hours, following which time the reaction mixture is partitioned between benzene and water. The benzene layer is separated, washed several times with dilute hydrochloric acid and water until neutral, then dried over anhydrous sodium sulfate and stripped of solvent under reduced pressure to afford estr-4-ene-3,17-dione, characterized by an ultraviolet absorption maximum, in methanol, at about 240 millimicrons.

EXAMPLE 11

To a solution of 16.4 parts of lithium tri(tertiary-butoxy)aluminum hydride in 63 parts of tetrahydrofuran under nitrogen is added, rapidly at about 0°, a solution of 7.46 parts of estr-4-ene-3,17-dione 17-diethyl ketal in 81 parts of tetrahydrofuran. Stirring is continued for about 3½ hours, during which time the reaction mixture warms to room temperature. Saturated aqueous ethylene diamine tetraacetic acid tetrasodium salt and benzene are then added, and the benzene layer is separated by decantation, then filtered in order to remove inorganic salts. Those salts are washed on the filter with benzene, and the benzene washings are combined with the original organic solution. The combined solution is washed successively with saturated aqueous ethylene diamine tetraacetic acid tetrasodium salt and water until neutral, then dried over anhydrous sodium sulfate and stripped of solvent under reduced pressure to afford 3β-hydroxyestr-4-en-17-one 17-diethyl ketal.

EXAMPLE 12

To a solution of 1.015 parts of 3β-hydroxy-estr-4-en-17-one 17-diethyl ketal in 11 parts of methanol is added a solution of 4.8 parts of acetic acid in 2 parts of water, and the resulting reaction mixture is stirred for about 10 minutes at room temperature, in a nitrogen atmosphere. The mixture is then partitioned between benzene and water, and the layers are separated. The benzene layer is washed successively with 5% aqueous sodium hydroxide, water, dilute hydrochloric acid and water until neutral, then is dried over anhydrous sodium sulfate and concentrated to dryness under reduced pressure. The residual foam-like material is twice recrystallized from ether to afford 3β-hydroxyestr-4-en-17-one, melting at about 153–156.5°.

EXAMPLE 13

A two phase system consisting of a solution of 5 parts of 3-dimethylaminoestra-2,5(10)-dien-17-one 17-diethyl ketal in 264 parts of benzene and 2.4 parts of concentrated hydrochloric acid dissolved in 100 parts of water is stirred vigorously at room temperature for about 16 hours. The layers are then separated, and the benzene layer is washed successively with dilute hydrochloric acid, 5% aqueous sodium bicarbonate and water until neutral, then dried over anhydrous sodium sulfate and concentrated to dryness under reduced pressure. The residual oily residue crystallizes upon standing and is further purified by two recrystallizations from ether to afford estr-5(10)-ene-3,17-dione, melting at about 130–132°.

The hydrochloric acid solutions are combined, washed with benzene, then made alkaline by the addition of 5% aqueous sodium hydroxide and extracted with benzene. The benzene solution is washed with water until neutral, then dried over anhydrous sodium sulfate and evaporated to dryness under reduced pressure to afford the crude product as a crystalline residue, melting at 135–140°. Recrystallization from ether followed by dissolution in benzene, washing of the resulting organic solution successively with dilute hydrochloric acid and water until neutral, drying over anhydrous sodium sulfate, evaporation of the solvent under reduced pressure and again recrystallizing from ether affords pure estr-4-ene-3,17-dione, melting at about 160–161°.

EXAMPLE 14

To a solution of 3.41 parts of 3-dimethylaminoestra-1,3,5(10)-trien-17-one 17-diethyl ketal in 28 parts of acetone is added 35 parts by volume of 1 N hydrochloric acid, and the resulting reaction mixture is kept under nitrogen at room temperature for about 72 hours, then is diluted with benzene and washed with 5% aqueous sodium hydroxide. The aqueous layer is separated and extracted with benzene, and the benzene solutions are combined, then washed with water until neutral and dried over anhydrous sodium sulfate. Evaporation of the solution to dryness under reduced pressure affords a crystalline residue which is purified by recrystallization from ether to afford pure 3-dimethylaminoestra-1,3,5(10)-trien-17-one, melting at about 180–181°. It displays ultraviolet absorption maxima at about 253 and 304 millimicrons with molecular extinction coefficients of about 14,570 and 2,080, respectively.

EXAMPLE 15

To 130 parts of refluxing tertiary-amyl alcohol, is added portionwise 9.6 parts of potassium metal, under nitrogen with vigorous stirring. After solution is complete, the mixture is cooled to approximately 0°, and a slow stream of acetylene gas is passed over the surface with stirring for about 45 minutes. At the end of that time, 2.6 parts of 3β-hydroxyestr-4-en-17-one is added, and stirring and acetylene addition are continued at 0° for about 20 hours. At the end of that reaction period, the mixture is partitioned between water and benzene, and the aqueous layer is separated and extracted with benzene. The benzene solutions are combined, then washed until neutral with water and dried over anhydrous sodium sulfate. Evaporation of the solvent by distillation under reduced pressure affords the crude product as an oil. Crystallization from ether yields crystals of pure 17α-ethynylestr-4-ene-3β,17β-diol, melting at about 165–169°.

EXAMPLE 16

A mixture of 1.59 parts of 17α-ethynylestr-4-ene-3β,17β-diol, 10 parts of acetic anhydride and 20 parts of pyridine is heated on a steam bath, under nitrogen, for about 16 hours, then is cooled to room temperature and poured carefully, with stirring, into a mixture of ice and water. Stirring is continued for about 30 minutes longer, after which time the precipitate is collected by filtration, washed with water, dried in air and recrystallized from methanol containing a small quantity of triethylamine to afford 17α-ethynylestr-4-ene-3β,17β-diol 3,17-diacetate, melting at about 142–146°.

EXAMPLE 17

To a solution of 3.7 parts of malonic acid in 59 parts of methanol, under nitrogen, is added with stirring 7.4 parts of estr-5(10)-ene-3,17-dione and the resulting mixture is stirred until homogeneous, then is allowed to stand at room temperature for about 4½ hours. The mixture is then cooled to about 0°, and 5 parts of sodium methoxide followed by approximately 15 parts of ice are added successively with stirring. The resulting oily layer is extracted into benzene, and the resulting organic solution is washed several times with water, then dried over anhydrous sodium sulfate and concentrated to dryness under reduced pressure. Crystallization of the residual oil from ethanol containing a small quantity of triethylamine affords crystals of pure estr-5(10)-ene-3,17-dione 3-dimethyl ketal, melting at about 85–90°.

EXAMPLE 18

To 292 parts of refluxing tertiary-amyl alcohol is added portionwise 14.9 parts of potassium metal, and that mixture is stirred under nitrogen until the solution is complete. After cooling of that mixture to approximately 0°, a slow stream of acetylene is passed over the surface with stirring for about 45 minutes. At the end of that time, 4.41 parts of estr-5(10)-ene-3,17-dione 3-dimethyl ketal is added, and stirring and acetylene addition are continued at that temperature for about 20 hours. At the end of that reaction time, the mixture is partitioned between water and benzene, and the aqueous layer is separated and extracted with benzene. The combined benzene solutions are washed with water until neutral, then dried over anhydrous sodium sulfate and concentrated to dryness under reduced pressure. Crystallization of the resulting oily residue from methanol containing a small quantity of triethylamine affords 17α-ethynyl-17β-hydroxyestra-5(10)-en-3-one 3 - dimethyl ketal, melting at about 170–174°.

EXAMPLE 19

To a solution of 1.96 parts of 17α-ethynyl-17β-hydroxyestr-5(10)-en-3-one 3-dimethyl ketal in 29 parts of acetone, under nitrogen, is added, with stirring, a solution of 0.98 part of malonic acid in 15 parts of water. Stirring is continued for about 20 minutes; then a portion of the solvent is removed by distillation under reduced pressure. Dilution with water results in crystallization of the product, which is collected by filtration, washed with water and dried, thus producing 17α-ethynyl-17β-hydroxyestr-5(10)-en-3-one, melting at about 141–145.5°.

EXAMPLE 20

A mixture of 4.7 parts of 17α-ethynyl-17β-hydroxyestr-5(10)-en-3-one with 576 parts of isopropyl alcohol, 28.8 parts of concentrated hydrochloric acid and 48 parts of water is allowed to stand, under nitrogen, at room temperature for about 16 hours, then is diluted with water. The resulting crystalline solid is collected by filtration, then recrystallized from ether to afford pure 17α-ethynyl-17β-hydroxyestr-4-en-3-one, melting at about 179–181°.

EXAMPLE 21

The substitution of an equivalent quantity of 3-dimethylaminoestra-1,3,5(10)-trien-17-one 17-dimethyl ketal in the procedure of Example 6 results in 3-dimethylamino-estra-2,5(10)-dien-17-one 17-dimethyl ketal. This compound is represented by the following structural formula

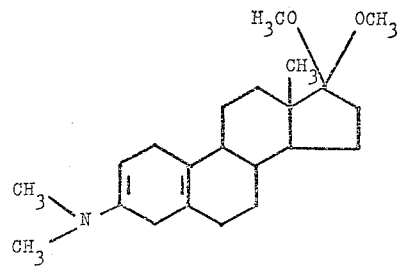

EXAMPLE 22

The substitution of an equivalent quantity of 3-dimethylaminoestra-2,5(10)-dien-17-one 17-dimethyl ketal in the procedure of Example 8 results in estr-4-ene-3,17-dione 17-dimethyl ketal.

EXAMPLE 23

When an equivalent quantity of 3-dimethylaminoestra-1,3,5(10),8(9)-tetraen-17-one 17-ethylene ketal in substituted in the procedure of Example 3, there is obtained 3-dimethylaminoestra-1,3,5(10)-trien-17 - one 17-ethylene ketal.

When an equivalent quantity of 3-dimethylaminoestra-1,3,5(10)-trien-17-one 17-ethylene ketal is substituted in the procedure of Example 6, there is produced 3-dimethyl-aminoestra-2,5(10)-dien-17-one 17-ethylene ketal.

EXAMPLE 24

The substitution of an equivalent quantity of 3-dimethylaminoestra-2,5(10)-dien-17-one 17-ethylene ketal in the procedure described in Example 8 results in estr--4-ene-3,17-dione 17-ethylene ketal.

EXAMPLE 25

To a solution of 14 parts of 3-diethylaminoestra-1,3,5(10),8(9),14-pentaen-17-one in 1,000 parts by volume of 20% pyridine in benzene is added 14 parts of 5% palladium-on-calcium carbonate catalyst, and that reaction mixture is stirred with hydrogen at atmospheric pressure and room temperature for about 2 hours. Removal of the catalyst by filtration followed by evaporation of the filtrate to dryness under reduced pressure affords a crystalline residue, which is purified by recrystallization from acetone-ethanol, thus producing 3-diethylaminoestra-1,3,5(10),8(9)-tetraen-17-one.

The substitution of an equivalent quantity of 3-diethylaminoestra-1,3,5(10),8(9)-tetraen-17-one in the procedure of Example 11 results in 3-diethylaminoestra-1,3,5(10), 8(9)-tetraen-17β-ol.

By substituting an equivalent quantity of 3-diethylaminoestra-1,3,5(10),8(9)-tetraen-17β-ol in the procedure of Example 3, there is obtained 3-diethylaminoestra-1,3,5(10)-trien-17β-ol.

When an equivalent quantity of 3-diethylaminoestra-1,3,5(10)-trien-17β-ol is substituted in the procedure of Example 5, there is obtained 3-diethylaminoestra-2,5(10)-dien-17β-ol.

EXAMPLE 26

The substitution of an equivalent quantity of 3-diethylaminoestra-2,5(10)-dien-17β-ol in the procedure of Example 7 results in 17β-hydroestr-5(10)-en-3-one, identical with the product of that Example.

EXAMPLE 27

When an equivalent quantity of 3-dimethylamino-13β-ethylgona-1,3,5(10),8(9),14-pentaen-17-one is hydrogenated by the procedure described in Example 25, there is produced 3-dimethylamino-13β-ethylgona-1,3,5(10),8(9)-tetraen-17-one.

By substituting an equivalent quantity of 3-dimethylamino-13β-ethylgona-1,3,5(10),8(9)-tetraen-17-one and otherwise proceeding according to the processes of Example 11, there is produced 3-dimethylamino-13β-ethylgona-1,3,5(10),8(9)-tetraen-17β-ol.

By substituting an equivalent quantity of 3-dimethylamino-13β-ethylgona-1,3,5(10),8(9)-tetraen-17β-ol and otherwise proceeding according to the processes described in Example 3, there is obtained 3-dimethylamino-13β-ethylgona-1,3,5(10)-trien-17β-ol.

The substitution of an equivalent quantity of 3-dimethylamino-13β-ethylgona-1,3,5(10)-trien-17β-ol in the procedure of Example 6 results in 3-dimethylamino-13β-ethylgona-2,5(10)-dien-17β-ol.

EXAMPLE 28

The substitution of an equivalent quantity of 3-dimethylamino-13β-ethylgona-2,5(10)-dien-17β-ol in the procedure of Example 7 results in 17β-hydroxy-13β-ethylgon-5(10)-en-3-one.

EXAMPLE 29

A mixture containing 7 parts of 3-acetamidoestra-1,3,5(10),8(9)-tetraen-17β-ol, 7 parts of sodium hydroxide and 389 parts of ethylene glycol is heated at the reflux temperautre, in a nitrogen atmosphere, with stirring for about 2¾ hours, then is cooled to room temperature and diluted with chloroform. The resulting organic solution is washed with water until neutral, then is dried over anhydrous sodium sulfate. Evaporation of the solvent under reduced pressure affords a residual foam-like substance which is dissolved in benzene, then is stirred with basic alumina for approximately 10 minutes. The mixture is filtered and again stirred with basic alumina using the same procedure. Removal of the alumina by filtration affords a benzene solution, which is concentrated to dryness under reduced pressure, thus yielding crystalline 3-aminoestra-1,3,5(10),8(9)-tetraen-17β-ol, melting at about 162–171° and exhibiting, in methanol, an ultraviolet absorption maximum at about 284 millimicrons with a molecular extinction coefficient of about 17,130.

When an equivalent quantity of 3-aminoestra-1,3,5(10),8(9)-tetraen-17β-ol is substituted in the procedure of Example 3, there is obtained 3-aminoestra-1,3,5(10)-trien-17β-ol.

The substitution of an equivalent quantity of 3-aminoestra-1,3,5(10)-trien-17β-ol in the procedure of Example 6 results in 3-aminoestra-2,5(10)-dien-17β-ol.

When an equivalent quantity of 3-aminoestra-2,5(10)-dien-17β-ol is substituted in the procedure of Example 7, there is produced 17β-hydroxyestr-5(10)-en-3-one, identical with the product of that example.

EXAMPLE 30

A mixture of 55 parts of 6-methylamino-1-vinyl-1-tetralol, 62.9 parts of triethylamine, 31.2 parts of 2-methylcyclopentane-1,3-dione and 996 parts of toluene is heated vigorously at the reflux temperature under nitrogen for about 10 minutes, during which time the water of reaction is continuously removed. The reaction mixture is rapidly cooled, then is diluted with benzene and washed successively with cold dilute aqueous sodium hydroxide and water. Drying of that solution over anhydrous sodium sulfate followed by evaporation of the solvent by distillation under reduced pressure affords a residual fluid brownish oil which is dissolved in 210 parts of ether containing approximately one part of triethylamine. That solution is stirred first at room temperature, then at 0–5° and the resulting solid product is collected by filtration and dried to afford 2-methyl-2-(6 - methylamino - 1 - naphthyliden)ethylcyclopentane-1,3-dione.

A mixture consisting of 31.4 parts of 2-methyl-2-(6 - methylamino - 1 - naphthyliden)ethylcyclopentane-1,3-dione, 1.57 parts of p-toluenesulfonic acid monohydrate and 825 parts of benzene is heated and stirred at the reflux temperature in a nitrogen atmosphere for about one hour, then is cooled to 0–5° in an ice bath. Dilution with benzene affords an organic solution which is washed successively with 5% aqueous sodium bicarbonate and water until neutral, then is dried over anhydrous sodium sulfate and evaporated to dryness by distillation under reduced pressure. The resulting solid product is 3-methylaminoestra-1,3,5(10),8(9),14-pentaen-17-one.

To a solution of 2 parts of 3-methylaminoestra-1,3,5(10),8(9),14-pentaen-17-one in 200 parts by volume of a 20% pyridine in benzene solution is added 2 parts of 5% palladium-on-calcium carbonate catalyst, and that mixture is shaken with hydrogen at atmospheric pressure and room temperature until one molecular equivalent of hydrogen has been absorbed. The catalyst is then removed by filtration and the solvent is distilled under reduced pressure to afford 3-methylaminoestra-1,3,5(10), 8(9)-tetraen-17-one.

The substitution of an equivalent quantity of 3-methylaminoestra-1,3,5(10),8(9)-tetraen-17-one in the procedure of Example 11 results in 3-methylaminoestra-1,3,5(10),8(9)-tetraen-17β-ol.

The substitution of an equivalent quantity of 3-methylaminoestra-1,3,5(10),8(9)-tetraen-17β-ol in the procedure of Example 3 results in 3-methylaminoestra-1,3,5(10)-trien-17β-ol.

When an equivalent quantity of 3-methylaminoestra-1,3,5(10)-trien-17β-ol is substituted in the procedure of Example 6, there is obtained 3-methylaminoestra-2,5(10)-dien-17β-ol.

EXAMPLE 31

By substituting an equivalent quantity of 3-methylaminoestra-2,5(10)-dien-17β-ol and otherwise proceeding according to the processes described in Example 7, there is obtained 17β-hydroxyestr-5(10)-en-3-one, identical with the product of that example.

EXAMPLE 32

When an equivalent quantity of 6-ethylamino-1-vinyl-1-tetralol is subjected to the successive processes described in Example 30, there is produced 3-ethylaminoestra-2,5(10)-dien-17β-ol.

EXAMPLE 33

The substitution of an equivalent quantity of 3-ethylaminoestra-2,5(10)-dien-17β-ol in the procedure of Example 7 results in 17β-hydroxyestr-5(10)-en-3-one, identical with the product of that example.

EXAMPLE 34

When an equivalent quantity of 3-pyrrolidino-estra-1,3,5(10)-trien-17β-ol is substituted in the procedure of Example 6, there is produced 3-pyrrolidino-estra-2,5(10)-dien-17β-ol.

EXAMPLE 35

When an equivalent quantity of 3-pyrrolidino-estra-2,5(10)-dien-17β-ol is substituted in the procedure of Example 7, there is produced 17β-hydroxyestr-5(10)-en-3-one, identical with the product of that example.

EXAMPLE 36

To a solution of 14 parts of 3-morpholinoestra-1,3,5(10),8(9),14-pentaen-17-one in 1,000 parts by volume of 20% pyridine in benzene is added 14 parts of 5% palladium-on-calcium carbonate catalyst, and that reaction mixture is stirred with hydrogen at atmospheric pressure and room temperature for about 2 hours. The catalyst is removed by filtration, and the resulting filtrate is evaporated to dryness under reduced pressure to afford, as a solid residue, 3-morpholinoestra - 1,3,5(10),8(9)-tetraen-17-one.

When an equivalent quantity of 3-morpholino-estra-1,3,5(10),8(9)-tetraen-17-one is substituted in the procedure of Example 11, there is produced 3-morpholino-estra-1,3,5(10),8(9)-tetraen-17β-ol.

The substitution of an equivalent quantity of 3-morpholinoestra - 1,3,5(10),8(9)-tetraen - 17β-ol in the procedure of Example 1 results in 3-morpholinoestra-1,3,5(10)-trien-17β-ol.

When an equivalent quantity of 3-morpholinoestra-1,3,5(10)-trien-17β-ol is substituted in the procedure of Example 5, there is produced 3-morpholinoestra-2,5(10)-dien-17β-ol.

EXAMPLE 37

The substitution of an equivalent quantity of 3-morpholinoestra-2,5(10)-dien-17β-ol in the procedure of Example 7 results in 17β-hydroxyestr-5(10)-en-3-one, identical with the product of that example.

EXAMPLE 38

A mixture containing 2.5 parts of 6-amino-1-tetralone, 6.5 parts of N,N-bischloroethylmethylamine, 16 parts of potassium carbonate, 30 parts of dioxane and 9 parts of water is heated with stirring at the reflux temperature, under nitrogen, for about 7 days. The dioxane layer is then separated by decantation, and the aqueous layer is extracted with benzene. The organic solutions are then combined and concentrated to a small volume by distillation under reduced pressure. The residual material is dissolved in benzene, and the resulting organic solution is extracted several times with dilute hydrochloric acid. These acidic extracts are combined, then made alkaline to pH 10 by the addition of ammonium hydroxide. The resulting precipitated product is collected by filtration and dried to afford 6-(N-methylpiperazino)-1-tetralone.

To 77 parts by a volume of a 1.4 M tetrahydrofuran solution of vinyl magnesium chloride in 22.6 parts of toluene is added, at —20° to —30° over a period of about 90 minutes, a solution of 5.9 parts of 6-(N-methyl-piperazino)-1-tetralone in 16 parts of toluene. The reaction mixture is allowed to stand for about one hour at a temperature between —20° and —10°, then is allowed to warm to about 15° over a period of about one hour. The mixture is then cooled to about —20°, and 14.4 parts of isopropyl alcohol and a saturated aqueous solution containing 45 parts of ethylene diamine tetraacetic acid tetrasodium salt are successively added. The organic layer is separated by decantation, then is diluted with toluene and washed with water. The washed solution is dried over anhydrous sodium sulfate, and 3.7 parts of triethylamine is added. Evaporation of the mixture to dryness under reduced pressure affords 6-(N-methylpiperazino)-1-vinyl-1-tetralol.

A mixture containing 13.3 parts of 6-(N-methylpiperazino)-1-vinyl-1-tetralol, 8 parts of 2-methylcyclo-pentane-1,3-dione, 250 parts of toluene and 16 parts of triethylamine is heated, in a nitrogen atmosphere, with stirring at the reflux temperature for about 4 hours, during which time the water of reaction is continuously removed. The reaction mixture is then cooled to 0–5° and diluted with benzene. Washing successively with cold dilute aqueous sodium hydroxide and water followed by drying over anhydrous sodium sulfate affords an organic solution, which is concentrated to dryness under reduced pressure to afford 2-methyl - 2-[6-(N-methylpiperazino) - 1-naphthyliden]ethylcyclopentane-1,3-dione.

A mixture of 9 parts of 2-methyl-2-[6-(N-methylpiperazino) - 1-naphthyliden]ethylcyclopentane-1,3-dione, 200 parts of benzene and 0.37 part of p-toluenesulfonic acid monohydrate is heated for about one hour at the reflux temperature in a nitrogen atmosphere, then is cooled and stirred with excess aqueous sodium hydroxide. The organic layer is then separated by decantation, washed with water, dried over anhydrous sodium sulfate and concentrated to dryness under reduced presure to afford 3-(N-methylpiperazino)estra - 1,3,5(10),8(9),14 - pentaen - 17- one.

A mixture containing 2 parts of 3-(N-methylpiperazino)estra-1,3,5(10),8(9),14-pentaen-17-one, 200 parts by volume of a 20% pyridine in benzene solution and 2 parts of 5% palladium-on-calcium carbonate catalyst is shaken with hydrogen at atmospheric pressure and room temperature until one molecular equivalent of hydrogen has been absorbed. Removal of the catalyst by filtration affords an organic solution, which is concentrated to dryness under reduced pressure to afford 3-(N-methylpiperazino)estra-1,3,5(10),8(9)-tetraen-17-one.

The substitution of an equivalent quantity of 3-(N-methylpiperazino)estra - 1,3,5(10),8(9)-tetraen-17-one in the procedure of Example 11 results in 3-(N-methylpiperazino)estra-1,3,5(10),8(9)-tetraen-17β-ol.

When an equivalent quantity of 3-(N-methylpiperazino)estra-1,3,5(10),8(9)-tetraen-17β-ol is substituted in the procedure of Example 1, there is obtained 3-(N-methylpiperazino)estra-1,3,5(10)-trien-17β-ol.

When an equivalent quantity of 3-(N-methylpiperazino)estra-1,3,5(10)-trien-17β-ol is substituted in the procedure of Example 5, there is obtained 3-(N-methylpiperazino)estra-2,5(10)-dien-17β-ol.

When an equivalent quantity of 3-(N-methylpiperazino)estra-2,5(10)-dien-17β-ol is substituted in the procedure of Example 7, there is produced 17β-hydroxyestr-5(10)-en-3-one, identical with the product of that example.

I claim:
1. A compound of the formula

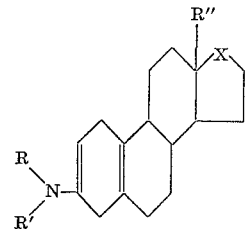

wherein R and R′ are members of the class consisting of hydrogen and lower alkyl radicals, R and R′ together comprise the residue of a secondary cycloaliphatic amine, R″ is a lower alkyl radical and X is selected from the group consisting of hydroxymethylene, alkylenedioxymethylene and di-(lower alkoxy)methylene radicals.

2. As in claim 1, the compound which is 3-dimethylaminoestra-2,5(10)-dien-17β-ol.

3. As in claim 1, the compound which is 3-dimethylaminoestra-2,5(10)-dien-17-one 17-diethyl ketal.

4. As in claim 1, the compound which is 3-pyrrolidinoestra-2,5(10)-dien-17β-ol.

5. As in claim 1, the compound which is 3-morpholinoestra-2,5(10)-dien-17β-ol.

References Cited

UNITED STATES PATENTS 3,055,885  9/1962  Nomine et al. _____ 260—239.5

OTHER REFERENCES

Alvarez et al.: J. Org. Chem., 30, pp. 2047–2049 (1965).

Ananchenko et al.: Tetrahedron Letters, 23, pp. 1553–1558 (1963), (p. 1555 relied on).

Fieser et al.: Steroids, Reinhold, New York, 1959, pp. 516 and 589.

LEWIS GOTTS, *Primary Examiner.*

T. M. MESHBESHER, *Assistant Examiner.*